United States Patent
Sun et al.

(10) Patent No.: US 8,599,890 B2
(45) Date of Patent: Dec. 3, 2013

(54) SYSTEMS AND METHODS FOR LASER PULSE EQUALIZATION

(75) Inventors: Yunlong Sun, Beaverton, OR (US); Feng Chang, Beijing (CN)

(73) Assignee: Electro Scientific Industries, Inc., Portland, OR (US)

(*) Notice: Subject to any disclaimer, the term of this patent is extended or adjusted under 35 U.S.C. 154(b) by 376 days.

(21) Appl. No.: 12/054,811

(22) Filed: Mar. 25, 2008

(65) Prior Publication Data
US 2009/0245300 A1   Oct. 1, 2009

(51) Int. Cl.
*H01S 3/13* (2006.01)

(52) U.S. Cl.
USPC ......... 372/30; 372/25; 372/38.02; 372/38.06; 372/38.07

(58) Field of Classification Search
USPC .............. 372/25, 30, 38.02, 38.06, 38.07
See application file for complete search history.

(56) References Cited

U.S. PATENT DOCUMENTS

| | | | |
|---|---|---|---|
| 4,038,610 A * | 7/1977 | Nishizawa et al. | 372/8 |
| 4,337,442 A | 6/1982 | Mauck | |
| 5,226,051 A | 7/1993 | Chan et al. | |
| 5,265,114 A | 11/1993 | Sun et al. | |
| 5,590,141 A | 12/1996 | Baird et al. | |
| 5,812,569 A | 9/1998 | Walker et al. | |
| 6,188,704 B1 * | 2/2001 | Kwon et al. | 372/25 |
| 6,418,154 B1 | 7/2002 | Kneip et al. | |
| 6,781,090 B2 | 8/2004 | Sun et al. | |
| 6,806,440 B2 | 10/2004 | Sun et al. | |
| 6,947,454 B2 | 9/2005 | Sun et al. | |
| 7,068,691 B2 * | 6/2006 | Chujo et al. | 372/38.02 |
| 7,486,705 B2 * | 2/2009 | Shah et al. | 372/25 |
| 2002/0009110 A1 | 1/2002 | Inoue et al. | |
| 2003/0048820 A1 * | 3/2003 | Fischer | 372/38.02 |
| 2003/0108078 A1 * | 6/2003 | McCarthy et al. | 372/69 |
| 2005/0225846 A1 * | 10/2005 | Nati et al. | 359/341.1 |
| 2006/0018350 A1 * | 1/2006 | Adams et al. | 372/34 |

FOREIGN PATENT DOCUMENTS

JP   2002359422   12/2002

OTHER PUBLICATIONS

Notification of Transmittal of the International Search Report and the Written Opinion of the International Searching Authority, or the Declaration for International Application No. PCT/US2009/037824, filed Mar. 20, 2009.

* cited by examiner

*Primary Examiner* — Tod T Van Roy
(74) *Attorney, Agent, or Firm* — Stoel Rives LLP

(57) ABSTRACT

Systems and methods provide laser pulse equalization at different pulse repetition frequencies (PRFs). After initially pumping a lasing medium from a first pumping level to a peak pumping level, a controller may cause a pump source to continue pumping the lasing medium according to a pulse equalization pumping curve. The equalization pumping curve may be determined based on testing laser pulse parameters at different PRFs to achieve an optimal equalization result of the pulse parameters. The optimization metric used to evaluate various equalization pumping curves may include a consistency of the pulse energy level, peak power level, and/or pulse width of the laser under different PRFs. The equalization pumping curve may be a descending curve from the peak pumping level to the first pumping level. The equalization pumping curve may be a linearly declining curve, a substantially exponentially declining curve, a parametrically declining curve, or any other curve type.

19 Claims, 3 Drawing Sheets

SYSTEMS AND METHODS FOR LASER PULSE EQUALIZATION

TECHNICAL FIELD

This disclosure relates to pulsed lasers and pulsed laser processing systems. In particular, this disclosure relates to equalizing laser pulses emitted at variable pulse repetition frequencies by pumping a laser using an optimal pulse equalization pumping curve.

BACKGROUND INFORMATION

Lasers are commonly used in a wide variety of research and development applications including spectroscopy, biotechnology applications, and industrial operations such as inspecting, processing, and micromachining a variety of media and substrates. In many of these applications, a pulsed laser may be used at a random, pseudo-random, and/or non-constant pulse repetition frequency ("PRF").

Certain laser applications, such as film trimming processes on silicon wafers, use overlapped laser pulses to make cuts on thin resistance film to change its resistance value to be within a desired accuracy range. Such a process may employ laser pulses at different PRFs and different overlapping, while the laser pulses should be substantially equal in their pulse energy, pulse width, and pulse peak power for high trimming quality.

In typical prior art lasers, a lasing medium may be pumped using an optical pump source. However, the laser energy per pulse may decrease with increasing PRF (e.g., due to reduced pumping time between pulses), while laser pulse width may increase with increasing PRF (e.g., due to reduced pumping time that results in lower lasing gain in the lasing medium). These issues may be particularly pronounced in Q-switched solid state lasers.

As discussed above, many laser applications use laser pulses at different PRFs. It may be desirable for some applications to maintain substantially constant pulse energy and pulse width at different PRFs. For example, in thin film trimming on silicon, inadequate laser pulse energy may result in incomplete trimming, while too much laser energy may result in unacceptable damage to the passivation structure or integrated circuit substrate.

Various approaches have been taken to ensure that laser operation remains within an acceptable process window (e.g., within defined pulse parameters for peak power, pulse energy, pulse width, and other parameters). For example, U.S. Pat. No. 4,337,442 titled "FIRST LASER PULSE AMPLITUDE MODULATION," which is assigned to the assignee of the present application, describes a method of laser pulse amplitude control by controlling laser pumping current.

U.S. Pat. No. 6,947,454, titled, "LASER PULSE PICKING EMPLOYING CONTROLLED AOM LOADING," issued to Sun et al., which is assigned to the assignee of the present application, describes a method for providing stable laser pulses at random intervals by blocking unused laser pulses with a pulse picking device, such as an acousto-optic modulator (AOM), while keeping the laser operating at a constant PRF.

U.S. Pat. No. 5,226,051 titled, "LASER PUMP CONTROL FOR OUTPUT POWER STABILIZATION," attempts to equalize pulse energy by providing current via pumping diodes according to a simple "step-type" function. In this approach, the lasing medium may be pumped at a first constant pumping level during a first pumping period, and at a second, lower constant level following the first pumping period during a second pumping period. This technique may work in laser applications where the PRF is relatively low. However, because it uses only two constant pumping currents, pulse equalization is less satisfactory. As such, this type of system may not be capable of delivering desired pulse equalization, nor capable of operating at higher PRFs.

FIG. 1 illustrates timing graphs of a prior art laser pumping system including a trigger signal 101, a pumping current signal 120 supplied by a current source, a graph 140 corresponding to stored energy in a lasing medium, and a graph 160 representing laser output pulses 162, 164.

The trigger signal 101 is used to initiate the Q-switch with the laser resonator for the generation of the laser pulses 162, 164. In order to produce the Q-switched laser pulses 162, 164, the lasing medium is energized by an optical pump source driven by a current or power source. The pump source may include, for example, a laser diode, diode bar or diode bar stack, or other pump source known in the art. The laser medium may include a solid state laser medium including, but not limited to neodymium-doped yttrium aluminum garnet (Nd:YAG), neodyminium-doped yttrium lithium fluoride (Nd:YLF), neodyminium-doped yttrium vandate (Nd:YVO$_4$), or other solid state lasing mediums used in the art.

The trigger signal 101 may include square wave triggers 102, 104 to initiate the action of the Q-switch and generation of the laser pulses 162, 164 by the leading (falling) edges of the 102, 104. A pump controller may respond to the trigger signals 102, 104 to cause the current or power driven pump source to pump the lasing medium according to a step function as represented by the substantially square pumping current signal 120.

The pumping current signal 120 may be supplied to the pump source at a standard pumping level $l_S$ for a pumping period $t_r$. The standard pumping level $l_S$ may be determined based on the PRF, pulse energy level, and pulse width used by the laser application. After the pumping time period $t_r$, the pumping current 120 supplied to the pump source may be abruptly switched to a reduced, maintaining pumping level $l_N$. The maintaining pumping level $l_N$ may be chosen, in some embodiments, to maintain the stored energy in the lasing medium at a desired or equalized level (e.g., equalized energy to produce an equalized laser pulse). Both the standard pumping level $l_S$ and the maintaining pumping level $l_N$ are substantially constant or flat.

The graph 140 shows an amount of stored energy in the lasing medium as a function of time with respect to the pumping current signal 120 and the trigger signal 101. During the pumping time period $t_r$, the energy stored in the lasing medium increases as the lasing medium is pumped using the pumping current signal 120 at the standard level $l_S$. This increase is shown at section 142 of graph 140. After the pumping time period $t_r$, the pumping current signal 120 is abruptly reduced to the maintaining level $l_N$, which causes the energy stored in the lasing medium to plateau at an energy level 144. The energy stored in the lasing medium is discharged (as indicated at reference 146) when the Q-switch allows a laser pulse to be emitted in response to the trigger signal 101. The energy level 144 may be selected such that the resulting laser pulse has acceptable power and pulse width according to the particular laser processing application. The Q-switches used may be an electro-optic Q-switch or an acousto-optic Q-switch, depending on the application and laser design.

The graph 160 shows the emission of the laser pulses 162, 164 relative to the trigger 101, the pumping current signal 120, and the graph 140 representing stored energy. At respective times corresponding to the laser pulses 162, 164, the Q-switch allows the lasing medium to emit laser pulse energy. As shown in the graph 140 representing the stored energy, this causes the energy stored in the lasing medium to be discharged from the lasing medium as a laser pulse 162, 164. Following the emission of a laser pulse 162, 164, the lasing medium may be re-energized by pumping the lasing medium at the standard pumping level $l_S$ for another pumping time period $t_r$, and then at the maintaining pumping level $r_N$.

For laser pulse firing after the pumping time period $t_r$, the stored energy may be at an equalized level, therefore the laser pulses will be equalized (e.g., as long as the PRF is lower than that of $1/t_r$). If the laser is fired at time intervals less than that of the pumping time period $t_r$, the lasing medium may not have been sufficiently energized to the equalized energy level when the laser pulse is emitted. This may result in a laser pulse with substantially less pulse energy and/or longer laser pulse width than intended. Prior art lasers may not be capable of delivering equalized laser pulses at high PRF because the substantially constant nature of the standard pumping level $l_S$ results in long pumping time periods $t_r$ used for the lasing medium to accumulate the desired stored energy. The maintaining pumping level $l_N$ is also of a substantially constant value. Due to the various details of different laser designs, materials used, and manufacturing processes, the pulse equalization effects within the desired PRF range may be unsatisfactory.

SUMMARY OF THE DISCLOSURE

Systems and methods for equalizing the peak power, energy and width of laser pulses in a laser system control a pumping current or power based on actual, tested laser performance. In one embodiment, a method for equalizing a series of laser pulses includes determining a pulse equalization pumping curve based on one or more observed laser pulse parameters when the laser is fired at a plurality of different pulse repetition frequencies. The pulse equalization pumping curve is configured to substantially equalize the one or more laser pulse parameters among the different pulse repetition frequencies. The method also includes generating a series of laser pulses to process respective targets. For each laser pulse in the series, the method includes driving the pump source from a first pumping level to a peak pumping level, driving the pump source from the peak pumping level toward the first pumping level according to the pulse equalization pumping curve, and firing the laser to produce a particular laser pulse having the substantially equalized one or more laser pulse parameters.

In another embodiment, a laser for equalizing a series of laser pulses emitted at a periodic, random, or pseudo-random pulse repetition frequency includes a lasing medium, a pump source to pump the lasing medium, and a pump controller communicatively coupled to the pump source. The pump controller is configured to drive the pump source from a first pumping level to a peak pumping level in a first time period and from the peak pumping level to the first pumping level according to a pulse equalization pumping curve in a second time period. The pulse equalization pumping curve is configured to substantially equalize one or more laser pulse parameters among different pulse repetition frequencies.

In another embodiment, a method for equalizing a series of laser pulses includes determining a peak pumping level of the pump source, determining a pulse equalization pumping curve configured to substantially equalize one or more laser pulse parameters among different pulse repetition frequencies, and driving the pump source from a first pumping level to the peak pumping level in a first time period. The method also includes driving the pump source from the peak pumping level to the first pumping level according to the selected pulse equalization pumping curve in a second time period.

Additional aspects and advantages will be apparent from the following detailed description of preferred embodiments, which proceeds with reference to the accompanying drawings.

DETAILED DESCRIPTION OF PREFERRED EMBODIMENTS

The embodiments disclosed herein equalize the peak power, pulse energy and pulse width of laser pulses in a laser system by controlling a laser pumping current or power based on actual, tested laser system performance. During laser pumping according to one embodiment, a laser pumping control system initially pumps the lasing medium from a maintaining pumping level to a peak pumping level. Thereafter, the controller causes the pump source to pump the lasing medium according to a pulse equalization pumping curve. The pulse equalization pumping curve may be selected and/or refined based on actual, tested laser system performance. The pulse equalization pumping curve may descend from the peak pumping level to the maintaining pumping level.

The peak pumping level of a particular laser system may be determined based on an operation rating of the laser system's pumping device, the properties of the laser system's lasing medium, and the particular laser operation (e.g., the pulse power, maximum PRF, and/or pulse width used during laser processing). In addition, or in other embodiments, the peak pumping level of a particular system may be determined and/or refined by testing. The pumping current rising rate may be determined by the rated value of the pumping device. In one embodiment, the maintaining pumping level is in a range between approximately 20% and approximately 90% of the peak pumping level.

After initially pumping the lasing medium from the maintaining pumping level to the peak pumping level, the control program continues pumping the lasing medium according to a pulse equalization pumping curve. The pulse equalization pumping curve may be determined and/or refined based on actual testing of the laser parameters to achieve an optimal pulse equalization result. In one embodiment, the pulse equalization pumping curve is determined by running a laser at a desired upper-limit of the PRF, measuring laser pulse peak power, pulse energy, and/or pulse width, and determining that these measured parameters are within desired value ranges. If one or more of the measured parameters are outside of the desired value ranges, the laser may be unable to deliver the performance desired. Then, the laser operation is changed to a lower PRF, and the pumping current's descending curve is adjusted from the peak value such that the laser pulse peak power, pulse energy, and/or pulse width are substantially the same as those measured at the upper-limit PRF. This process is repeated for a plurality of different PRFs, including the lowest PRF desired for a completed pulse equalization pumping current equalization pumping curve. The pulse equalization pumping curve may be a substantially linearly declining (e.g., declining from the peak value) curve, a substantially exponentially declining curve, a parametrically declining curve, or any other curve or function, depending on the particular laser design.

Figure 2:
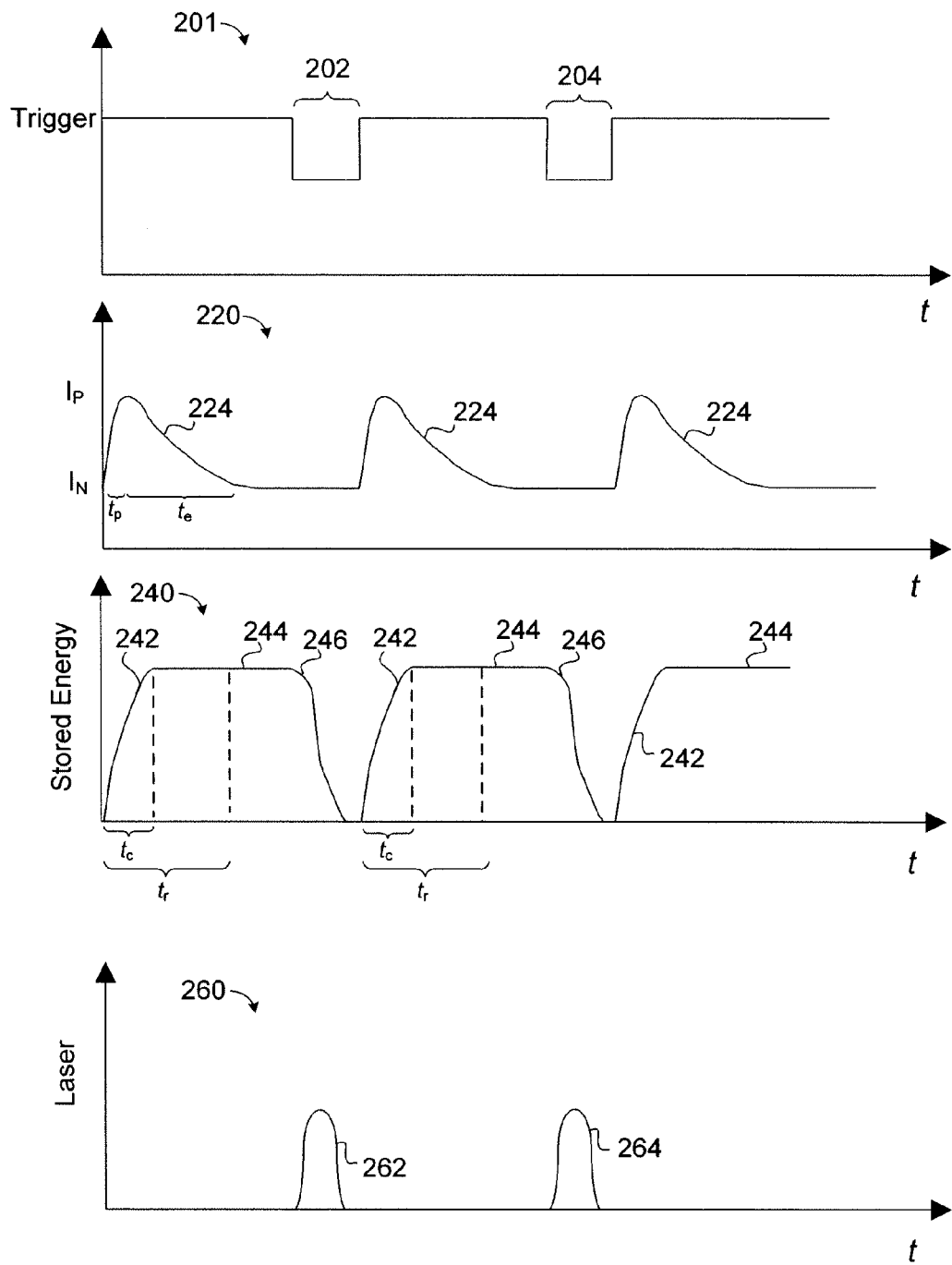
FIG. 2 illustrates timing graphs according to one embodiment of a trigger signal, a pumping current signal, a graph corresponding to stored energy in a lasing medium, and a graph representing laser output pulses.

FIG. 2 illustrates timing graphs according to one embodiment of a trigger signal 201, a pumping current signal 220, a graph 240 corresponding to stored energy in a lasing medium, and a graph 260 representing laser output pulses 262, 264.

The trigger 201 is used to trigger the generation of the laser pulses 262, 264. The trigger 201 may include square wave trigger signals 202, 204 that, in turn, initiate a laser Q-switch drive circuit to respectively produce the corresponding laser pulses 262, 264. As discussed above, the trigger signals 202, 204 of the trigger 201 may be generated at a regular PRF or at a random and/or pseudo-random PRF.

The pump controller drives a pump source according to the graph 220. The pump controller may initially cause the pump source to pump the lasing medium from a first or maintaining pumping level $1_N$ to a second or peak pumping level $1_P$ during a first time period $t_p$. As discussed above, the peak pumping level $1_P$ and pumping current rising rate may be based on an operation rating of the pump source (e.g., the maximum current or power the pump source is capable supplying), the properties of the lasing medium (e.g., the amount of current or power the lasing medium is capable of receiving without damage or excessive heating), and/or the particular laser operation. In addition, or in other embodiments, the peak pumping level $1_P$ may be determined and/or refined by actual testing of the laser system, pumping device, lasing medium, and pumping controller and its desired performance requirements.

Figure 1:
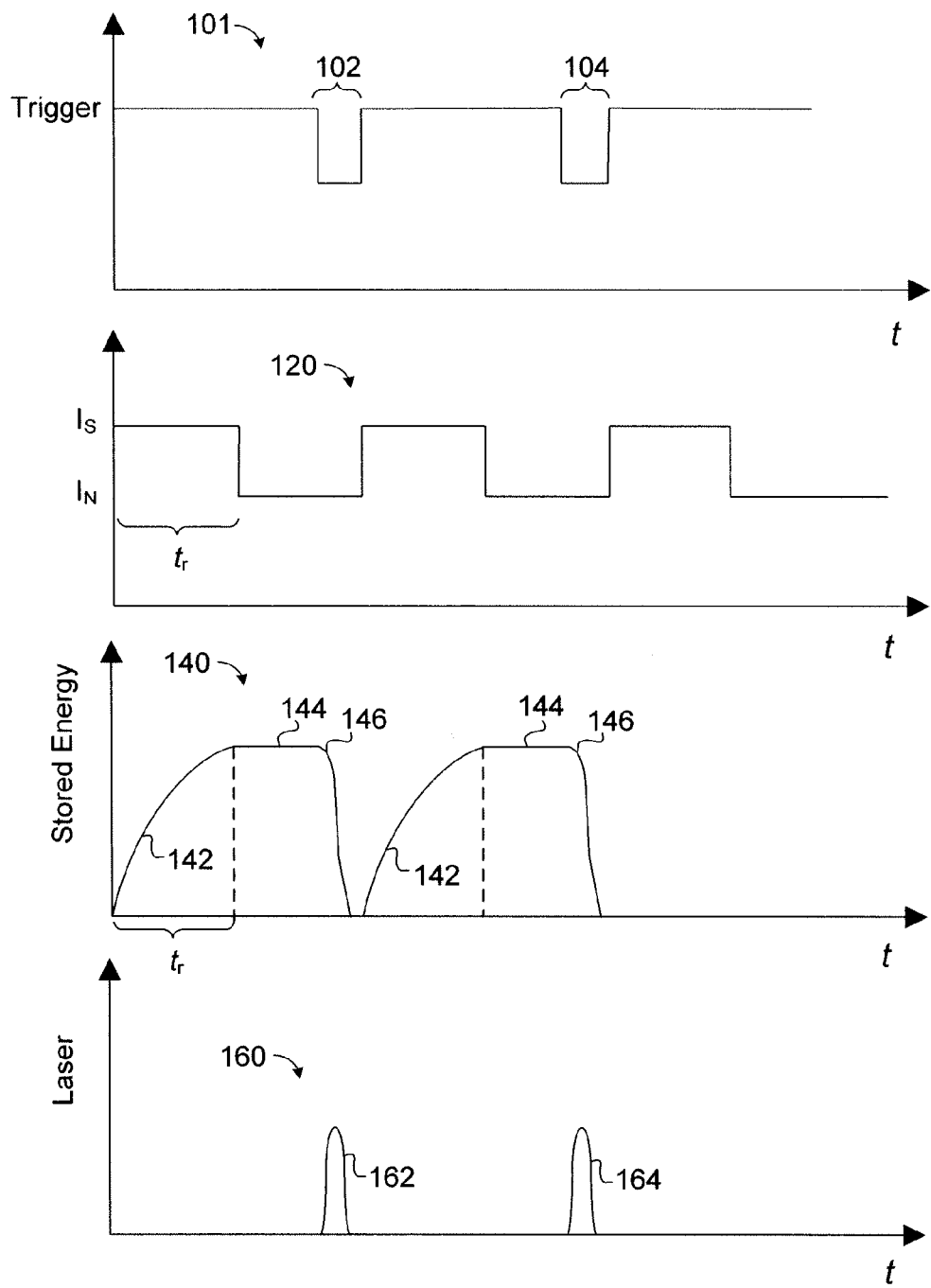
FIG. 1 illustrates timing graphs of a prior art laser pumping system including a trigger signal, a two-step constant pumping current signal supplied by a current source, a graph corresponding to stored energy in a lasing medium, and a graph representing laser output pulses.

After reaching the peak pumping level $1_P$, the controller may drive the pump source according to a pulse equalization pumping curve 224. The pulse equalization pumping curve 224 may descend from the peak pumping level $1_P$ to the maintaining pumping level $1_N$ during a second time period $t_e$. As shown in FIG. 1, the second time period $t_e$ may be substantially greater than or comparable to the first time period $t_p$, depending on the laser operation PRF.

The pulse equalization pumping curve 224 may be a declining curve from the peak pumping level $1_P$ to the maintaining pumping level $1_N$ (as opposed to an abrupt, discontinuous step function as depicted in the pumping current signal 120 shown in FIG. 1). Pumping the lasing medium with a pump source using the pulse equalization pumping curve 224 may reduce damage risk to the pump source and/or lasing medium. In addition, because the pulse equalization pumping curve 224 is determined based on tested laser performance, it may provide improved or ideal laser pulse equalization. Using the pulse equalization pumping curve 224 may also provide the ability to operate the laser system at higher PRFs with satisfactory pulse equalization.

The pulse equalization pumping curve 224 may be a linearly declining curve, a substantially exponentially declining curve (e.g., as depicted in FIG. 2), a parametrically declining curve, or another curve type. Different curve shapes may be selected depending on the properties of the pump source, the lasing medium, and the particular laser operation. As discussed above, various curve shapes and/or slope parameters for the pulse equalization pumping curve 224 may be evaluated and/or compared according to actual testing of the laser system. The pulse equalization pumping curve 224 may decline from the peak pumping level $1_P$ to the maintaining pumping level $1_N$. The pulse equalization pumping curve 224 may, or may not, be monotonically declining between peak pumping level $1_P$ and first, maintaining level $1_N$. Although not shown in FIG. 2, in certain embodiments, the pulse equalization pumping curve 224 may continue to decline below the maintaining pumping level $1_N$.

As discussed above, the rise from the maintaining pumping level $1_N$ to the peak pumping level $1_P$ takes place in the first time period $t_p$. The pulse equalization pumping curve 224 descends from the peak pumping level $1_P$ to the maintaining pumping level $1_N$ in the second time period $t_e$. Depending on the PRF, the second time period $t_e$ may be substantially greater than the first time period $t_p$. The pulse equalization pumping curve 224 is configured to provide equalized laser pulses at PRFs in a range between approximately 0 Hz and approximately 1/(the first time period $t_p$) Hz. In one example embodiment, the pulse equalization pumping curve 224 provides equalized laser pulses at PRFs as high as approximately 20 kHz. An artisan will recognize, however, that many other maximum PRF values are possible, depending on the particular laser.

Although FIG. 2 illustrates the pulse equalization pumping curve 224 immediately descending after reaching the peak pumping level $1_P$, the pulse equalization pumping curve 224 may also stay at the peak pumping level $1_P$ for a period of time before descending to the maintaining pumping level $1_N$. The amount of time that the pulse equalization pumping curve 224 remains at the peak pumping level $1_P$ may depend on the desired laser pulse energy level used for a particular laser operation.

The graph 240 illustrates the amount of energy stored in a lasing medium of the laser system as a function of time. As the pump source supplies current or power at the peak pumping level $1_P$, the energy stored in the lasing medium may increase. This increase is shown at section 242 of the graph 240. Thereafter, as the pump source is driven according to the pulse equalization pumping curve 224, the stored energy 240 may reach and be maintained at a substantially constant level 244. The stored energy level 244 may correspond to the generation of a respective laser pulse 262, 264 having a peak power, pulse energy and/or pulse width within an acceptable range. The pulse equalization pumping curve 224 may cause the energy stored in the lasing medium to be maintained at the substantially constant pulse energy level 244 until the respective laser pulse 262, 264 is emitted. As the laser pulse 262, 264 is emitted, the energy stored within the lasing medium may be rapidly expended, as illustrated at section 246 of the graph 240.

By initially driving the pump source to pump the lasing medium at the peak value $1_P$, and according to the pulse equalization pumping curve 224 thereafter, the lasing medium becomes energized more quickly and consistently than prior art systems. As such, the laser system is capable of emitting conforming pulses 262, 264 (e.g., pulses conforming to a particular specification range) at a higher PRF than that of conventional systems. For example, referring again to FIG. 1, the time for the lasing medium to reach an acceptable power level is depicted as the pumping time period $t_r$. For illustrative purposes, this pumping time period $t_r$ is replicated on the graph 240 shown in FIG. 2. As shown in FIG. 2, the energization time period $t_c$ for charging the lasing material is substantially less than the pumping time period $t_r$ used to charge the lasing material in prior art systems. As such, a laser pumped as disclosed herein may be operated at a higher PRF with equalized laser pulse output than that of a prior art laser pumped using a simple, discontinuous square wave (as shown in the pumping current signal 120 illustrated in FIG. 1). In addition, because the pulse equalization pumping curve 224 is determined based on actual testing of the laser system, the laser is more likely to deliver equalized laser pulses with higher accuracy within the desired PRF range.

Figure 3:
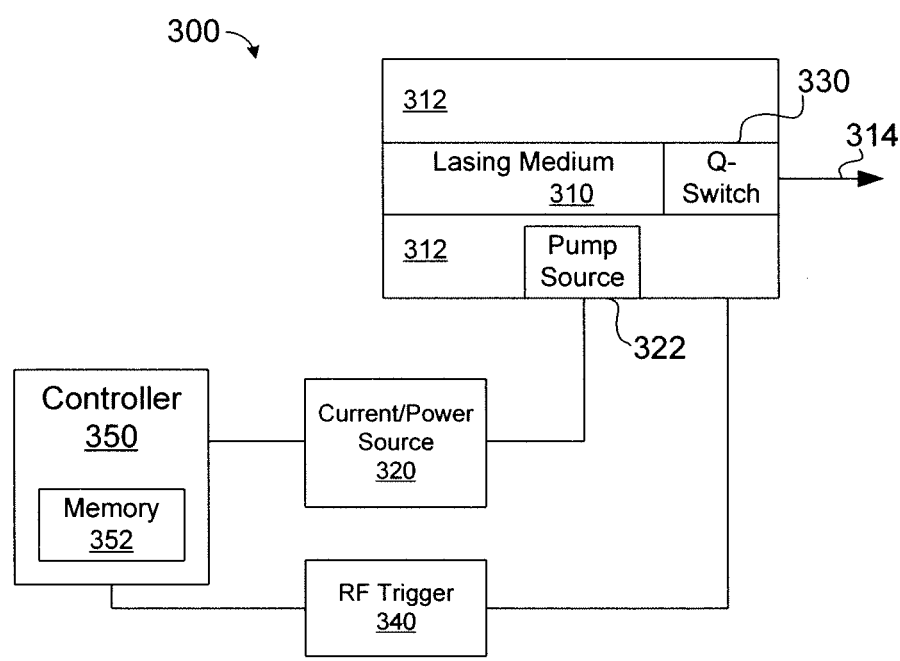
FIG. 3 is a block diagram of a laser system 300 according to one embodiment.

FIG. 3 is a block diagram of a laser system 300 according to one embodiment. The laser system 300 includes a lasing medium 310 encased in a heat exchanger 312, a Q-switch 330 to control laser output 314, a pump source 322 to pump the lasing medium 310 (other components of the laser are not shown), a current or power source 320 to drive the pump source 322, a trigger 340, and a controller 350 including and/or in communication with a memory 352.

As discussed above, the lasing medium 310 may comprise a Nd:YAG rod, or any other lasing medium known in the art. The lasing medium 310 may be mounted in and/or encapsulated by the heat exchanger 312. The heat exchanger 312 provides passive and/or active cooling (e.g., by circulating a cooling liquid or by thermoelectric cooling).

The current and/or power source 320 drives the pump source 322, which in turn energizes the lasing medium 310. The pump source 322 may include a laser diode, diode bars or stack of diode bars, or any other pumping mechanism known in the art.

The Q-Switch 330 is inserted in the laser resonator (not shown). The Q-switch 330 may include, for example, an acousto-optic or electro-optic switch or any other switching mechanism known in the art. The Q-switch 330 controls the emission of laser pulses from the lasing medium 310 via the output 314.

The trigger 340 may generate one or more control signals to cause the laser system 300 to emit one or more laser pulses. As such, the trigger 340 is communicatively coupled to the Q-switch 330 and to the pumping controller 350. The trigger 340 generates one or more signals to cause the Q-switch 330 to allow a laser pulse to be emitted from the output 314. In addition, the trigger 340 is communicatively coupled to the pumping controller 350 to cause the controller 350 to energize the lasing medium 310 in preparation of emitting a laser pulse. The controller 350 causes the current/power source 320 to drive the pump source 322 from a first or maintaining pumping level to a second or peak pumping level, and to drive the pump source 322 from the peak pumping level to the maintaining pumping level according to a pulse equalization pumping curve, until a pulse is emitted. Once a pulse is emitted, the process is repeated (e.g., the controller 350 causes the current/power source 320 to sequentially drive the pump source 322 to the peak pumping level, according to the pulse equalization pumping curve, and at the maintaining pumping level).

The controller 350 may include and/or be communicatively coupled to the memory device 352. The memory device 352 may have stored thereon the maintaining pumping level, the peak pumping level, and the pulse equalization pumping curve associated with the particular laser. The controller 350 may be configured to read these values from the memory device 352 for use in the pulse equalization operation.

It will be understood by those having skill in the art that many changes may be made to the details of the above-described embodiments without departing from the underlying principles of the invention. The scope of the present invention should, therefore, be determined only by the following claims.

The invention claimed is:

1. A method for equalizing a series of laser pulses emitted at a periodic, random, or pseudo-random pulse repetition frequency by a laser comprising a lasing medium energized by a pump source, the method comprising:
   determining a pulse equalization pumping curve based on one or more measured laser pulse parameters of the laser obtained by firing the laser at a plurality of different pulse repetition frequencies, wherein the pulse equalization pumping curve gradually changes levels from a peak pumping level to a first pumping level and is configured to substantially equalize the one or more laser pulse parameters of the laser among the different pulse repetition frequencies; and
   generating a series of laser pulses, for each laser pulse in the series:
      driving, at a rising rate of change, the pump source from a first pumping level to a peak pumping level;
      driving, at a continuously falling rate of change after initially reaching the peak pumping level, the pump source from the peak pumping level toward the first pumping level according to the gradually changing level of the pulse equalization pumping curve, wherein the pump source is driven based on the rising rate of change so as to initially depart from the first pumping level and initially arrive at the peak pumping level in a first time period, wherein the pump source is driven based on the falling rate of change so as to initially depart from the peak pumping level and initially arrive at the first pumping level according to the selected pulse equalization pumping curve in a second time period, and wherein the second time period is substantially greater than the first time period; and
      firing the laser to produce a particular laser pulse having the substantially equalized one or more laser pulse parameters.

2. The method of claim 1, wherein the one or more laser pulse parameters are selected from the group comprising laser pulse peak power, laser pulse energy, and laser pulse width.

3. The method of claim 1, wherein the different pulse repetition frequencies, throughout which the pulse equalization pumping curve is configured to substantially equalize the one or more laser pulse parameters, are in a range between approximately 0 Hz and approximately 1/(the first time period) Hz.

4. The method of claim 1, wherein the pulse equalization pumping curve remains at the peak pumping level for a third period of time before descending toward the first pumping level, the third period of time based on a desired laser pulse energy level.

5. The method of claim 1, wherein the pulse equalization pumping curve is a linearly declining curve from the peak pumping level to the first pumping level.

6. The method of claim 1, wherein the pulse equalization pumping curve is a substantially exponentially declining curve from the peak pumping level to the first pumping level.

7. The method of claim 1, wherein the pulse equalization pumping curve is a parametrically declining curve from the peak pumping level to the first pumping level.

8. The method of claim 1, wherein the peak pumping level is based on an operation rating of the pump source.

9. The method of claim 1, wherein the first pumping level is in a range between approximately 20% and approximately 90% of the peak pumping level.

10. A laser for equalizing a series of laser pulses emitted at a periodic, random, or pseudo-random pulse repetition frequency, the system comprising:
   a lasing medium;
   a pump source to pump the lasing medium; and a pump controller communicatively coupled to the pump source, wherein the pump controller is configured to drive the pump source so as to output a driving current signal that initially departs from a first pumping level and initially arrives at a peak pumping level in a first time period and that initially and continuously departs from the peak pumping level after initially reaching the peak pumping level and initially arrive at the first pumping level according to a gradually changing pulse equalization pumping curve in a second time period, wherein the second time period is substantially greater than the first time period, and wherein the pulse equalization pumping curve is based on one or more measured laser pulse parameters of the laser obtained by firing the laser at a plurality of different pulse repetition frequencies and is configured to substantially equalize the one or more laser pulse parameters among the different pulse repetition frequencies.

11. The laser of claim 10, wherein the gradually changing pulse equalization pumping curve is based on one or more observed laser pulse parameters when the laser is driven at a plurality of different pulse repetition frequencies, wherein the gradually changing pulse equalization pumping curve is configured to substantially equalize the one or more laser pulse parameters among the different pulse repetition frequencies.

12. The laser of claim 11, wherein the one or more laser pulse parameters are selected from the group comprising laser pulse peak power, laser pulse energy, and laser pulse width.

13. The laser of claim 10, wherein the pulse equalization pumping curve is a linearly declining curve.

14. The laser of claim 10, wherein pulse equalization pumping curve is a substantially exponentially declining curve.

15. The laser of claim 10, wherein pulse equalization pumping curve is a parametrically declining curve.

16. The laser of claim 10, wherein the pump source is selected from the group comprising one or more laser diodes, diode bars, and stack of diode bars.

17. The laser of claim 10, wherein the lasing medium is selected from the group comprising neodymium-doped yttrium aluminum garnet (Nd:YAG), neodyminium-doped yttrium lithium fluoride (Nd:YLF), and neodyminium-doped yttrium vandate (Nd:YVO$_4$).

18. The laser of claim 10, wherein the peak pumping level of the pump source is based on an operation rating of the pump source.

19. A method for equalizing a series of laser pulses emitted at a periodic, random, or pseudo-random pulse repetition frequency by a laser system comprising a lasing medium coupled to a pump source, the method comprising:

determining a peak pumping level of the pump source;

determining a gradually changing pulse equalization pumping curve based on one or more measured laser pulse parameters of the laser system obtained by firing the laser system at a plurality of different pulse repetition frequencies, wherein the gradually changing pulse equalization pumping curve is configured to substantially equalize the one or more laser pulse parameters among different pulse repetition frequencies;

driving the pump source from a first pumping level to the peak pumping level in a first time period; and driving the pump source, after initially reaching the peak pumping level, so as to initially and continuously depart from the peak pumping level and initially arrive at the first pumping level according to the selected gradually changing pulse equalization pumping curve in a second time period, wherein the second time period is substantially greater than the first time period.

* * * * *